(12) United States Patent
Willat et al.

(10) Patent No.: US 7,304,636 B2
(45) Date of Patent: Dec. 4, 2007

(54) ERGONOMIC MOUSE

(75) Inventors: Boyd I. Willat, Los Angeles, CA (US);
Gary D. Delgado, New York, NY (US)

(73) Assignee: Willat, Los Angeles, CA (US)

( * ) Notice: Subject to any disclaimer, the term of this patent is extended or adjusted under 35 U.S.C. 154(b) by 0 days.

(21) Appl. No.: 10/901,318

(22) Filed: Jul. 27, 2004

(65) Prior Publication Data

US 2005/0062717 A1    Mar. 24, 2005

(51) Int. Cl.
G09G 5/08    (2006.01)

(52) U.S. Cl. .................................................. 345/163

(58) Field of Classification Search ............... 345/156, 345/157, 163–166; 248/118.5; D14/402, D14/405, 409, 410
See application file for complete search history.

(56) References Cited

U.S. PATENT DOCUMENTS

| | | | |
|---|---|---|---|
| D355,901 S | 2/1995 | Bradley | D14/114 |
| 5,428,368 A | 6/1995 | Grant | 345/163 |
| 5,433,407 A * | 7/1995 | Rice | 248/118.1 |
| 5,490,647 A * | 2/1996 | Rice | 248/118.1 |
| 5,570,112 A * | 10/1996 | Robinson | 345/163 |
| D375,729 S | 11/1996 | Aeschbacher et al. | D14/114 |
| 5,648,798 A | 7/1997 | Hamling | 345/163 |
| 5,692,956 A | 12/1997 | Rifkin | 463/37 |
| 5,731,807 A * | 3/1998 | Feierbach | 345/163 |
| 5,793,355 A | 8/1998 | Youens | 345/157 |
| 5,865,404 A * | 2/1999 | Hesley | 248/118 |
| 5,886,686 A | 3/1999 | Chen | 345/168 |
| 5,913,497 A * | 6/1999 | Myers | 248/118.5 |
| 5,923,318 A * | 7/1999 | Zhai et al. | 345/157 |
| 6,016,138 A * | 1/2000 | Harskamp et al. | 345/163 |
| 6,107,991 A * | 8/2000 | Osborn | 345/157 |
| 6,115,028 A * | 9/2000 | Balakrishnan et al. | 345/157 |
| 6,157,370 A * | 12/2000 | Kravtin et al. | 345/163 |
| 6,193,196 B1 | 2/2001 | Hesley | 248/118.1 |
| 6,195,085 B1 * | 2/2001 | Becker et al. | 345/163 |
| 6,219,037 B1 | 4/2001 | Lee | 345/167 |
| 6,390,423 B1 * | 5/2002 | Danzyger et al. | 248/118 |
| 6,411,281 B1 * | 6/2002 | Sasselli et al. | 345/163 |
| 6,417,843 B1 * | 7/2002 | Stephens et al. | 345/167 |
| 6,441,805 B1 | 8/2002 | Reid et al. | 345/163 |
| 6,486,868 B1 * | 11/2002 | Kazarian | 345/156 |
| 6,486,873 B1 | 11/2002 | McDonough et al. | 345/163 |
| 6,489,947 B2 * | 12/2002 | Hesley et al. | 345/163 |
| D470,495 S | 2/2003 | Sheehan et al. | D14/409 |
| 6,704,003 B2 * | 3/2004 | Tiphane et al. | 345/163 |
| D495,711 S * | 9/2004 | Willat et al. | D14/402 |
| 6,844,871 B1 * | 1/2005 | Hinckley et al. | 345/163 |
| 6,921,054 B2 * | 7/2005 | Doan | 248/118.5 |
| 2004/0233169 A1 * | 11/2004 | Willat et al. | 345/163 |
| 2005/0275621 A1 * | 12/2005 | Saez et al. | 345/156 |

* cited by examiner

*Primary Examiner*—Jeff Piziali
(74) *Attorney, Agent, or Firm*—Kelly Lowry & Kelley, LLP; Stuart O. Lowry

(57) ABSTRACT

A system that may couple to a computer that may include a selectably interchangeable pointing device controller, and further may include an ergonomic design that may include a front portion and a rear portion where the front portion is configured to move horizontally and vertically with respect to the rear portion.

9 Claims, 3 Drawing Sheets

ERGONOMIC MOUSE

BACKGROUND

Extended use of a computer-pointing device, such as a computer mouse, may cause a computer user to suffer from cumulative trauma disorder (CTD) or repetitive stress injuries (RSI). Computer users may often be afflicted with pains in the hands and the wrists that may be caused by excessive wrist movements such as flexion and hyperextension of the wrist. Computer users may also suffer from soreness and fatigue in the shoulders and the neck due to excessive arm and shoulder motions associated with use of computer-pointing devices.

Long periods of repetitive motion associated with the use of the computer mouse coupled with incorrect hand posture while using the mouse may cause disorders in the hand, wrist, elbow, shoulder, and neck, such as carpal tunnel syndrome, among others. Repetitive stress injuries, such as carpal tunnel syndrome, may be disabling and are costly to employers and employees alike, including both medical expenses and lost work time.

Furthermore, there are many different types of pointer control devices that include, but are not limited to, a touch pad, track ball, buttons, wheel and a stick. Typically a single type may be included with a mouse. This may present problems if a user prefers another type of device.

Accordingly, there is a need for a computer input system, such as, but not limited to, a computer mouse, which may reduce stress and help to prevent injuries while not impeding the productivity of the computer user. Further, it is desirable to provide more than one type of interchangeable pointing device controller, as desired by the user. Yet further what is needed is a system that may allow micro movements of the fingers of a user without having to move the entire hand, wrist and/or arm.

SUMMARY

Provided are exemplary embodiments, which may include a system that may couple to a computer that may include a selectably interchangeable pointing device controller, and further may include an ergonomic design that may include a front portion and a rear portion where the front portion is configured to move horizontally and vertically with respect to the rear portion.

DETAILED DESCRIPTION

The detailed description set forth below in connection with the appended drawings is intended as a description of exemplary embodiments and is not intended to represent the only forms in which the embodiments may be constructed and/or utilized. The description also sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of this disclosure.

Figure 1:
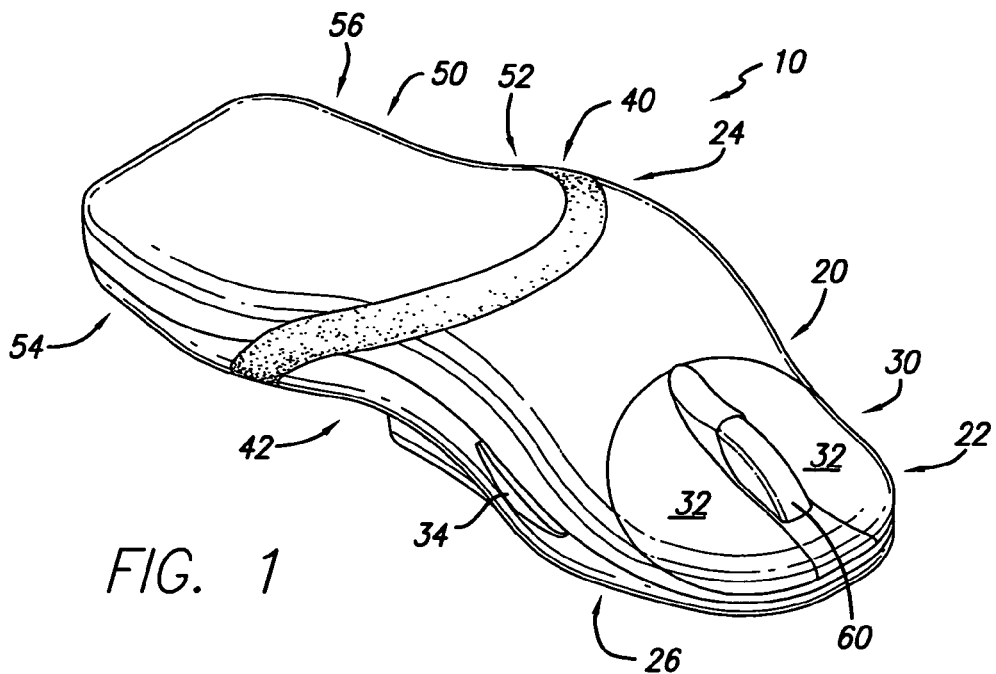
FIG. 1 is a perspective view of an exemplary embodiment of an input system.

An input system according to an exemplary embodiment is shown in FIG. 1, generally at 10. System 10 may include a front portion 20 and rear portion 50, with a middle portion 40 configured to couple the front portion 20 to rear portion 50. System 10 may be contoured in an arch-like manner, thereby creating a recess 42 in the lower support contacting surface of the system 10. With this arch-like configuration, the mouse may be more ergonomic and reduce repetitive stress injuries, and the like.

Middle portion 40 may be made of a flexible material such as foam, rubber, or other flexible material and/or configuration such that front portion 20 may move independently of rear portion 50. With this configuration, a user may be able to make micro movements with the front portion 20 with respect to rear portion 50, such that the entire wrist and arm may not need to move to move front portion 20, and consequently, a cursor and/or pointer controlled by this system 10.

Front portion 20 may include a front end 22 as well as a back end 24. Furthermore, front portion 20 may include a surface contacting portion 26 that may be configured to contact a mouse pad or other support surface utilized by the input system 10 to control a pointing device. Front portion 20 may further include an input device portion 30 which may be interchangeable as described below. Input device portion 30 may include buttons 32 as well as side buttons 34 and wheel 60 to control the movements of a cursor or other pointing device, as desired.

Rear portion 50 may include a front end 52 and a rear end 54. Rear end 54 may include a rest 56 configured to receive a user's hand, heel of the hand, or wrist to rest thereupon. Rest 56 is typically made from a flexible, soft rubber or gel-filled fabric; however, other comfortable materials and configurations may be utilized, as desired.

Front end 52 or rear portion 50 may be configured to generally correspond to the back end 24 of front portion 20, such that it may be easier to move front portion 20 with respect to rear portion 50, as desired. It will be appreciated that with this configuration that front portion 20 may move laterally as well as vertically and horizontally with respect to rear portion 50 due to flexible middle portion 40. This may allow a user to accomplish micro movements while not moving their entire wrist and/or arm to move front portion 20 with respect to rear portion 50, to control the pointing device and/or cursor controlled by this system.

FIG. 1 may show the ergonomic design of system 10, such that it may provide a soft support for the wrist and heel of a user's hand, and support the palm, heel of the hand, and hand, and allow the fingers to dangle over middle portion 40, to front portion 20 to operate buttons 32, side buttons 34, and/or wheel 60, or other devices as desired.

Figure 2:
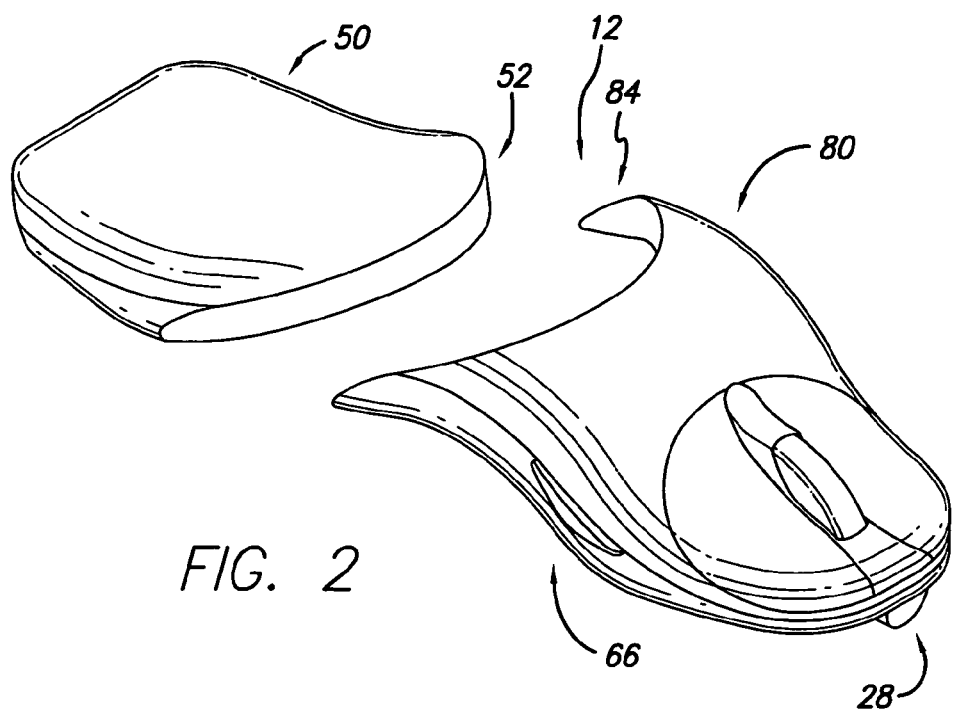
FIG. 2 is a perspective view of another exemplary embodiment of an input system.

FIG. 2 shows another exemplary embodiment of an input system, generally at 12. System 12 may include a front portion 80 as well as a rear portion 50. Front portion 80 may include a rear end 84 as well as a keel 28. Keel 28 may allow the user to accomplish micro movements of the user's fingers and front portion 20, without moving their wrist and entire arm by allowing front portion 80 to move vertically as well as horizontally with respect to rear portion 50 and/or the support surface. This may make it easier and less stressful to consequently control the corresponding cursor and/or pointing device.

System 12 may also include a rear portion 50 which may be configured to receive the wrist of a user comfortably to further reduce repetitive stress injuries. Furthermore, rear portion may include a front end 52 which may generally correspond to rear end 84 of front portion 80 to allow more freer movement of front portion 80 with respect to rear portion 50. Furthermore, this configuration may enhance the use of the system 12 as well as help coordinate movements of front portion 80 with respect to rear portion 50.

Front portion 80 may also include a lower surface 66, which, with keel 28, may be non-planar. With this non-planer lower surface configuration, it will be appreciated that horizontal as well as vertical movements may be made with front portion 80 micro movements, such that a user may move the pointing device without moving the entire wrist or arm. Furthermore, front portion 80 and rear portion 50 may have an arch-like configuration, which may allow the fingers of a user to dangle over front portion in a ergonomic manner, which may further reduce the likelihood of stress injuries from occurring.

Figure 3:
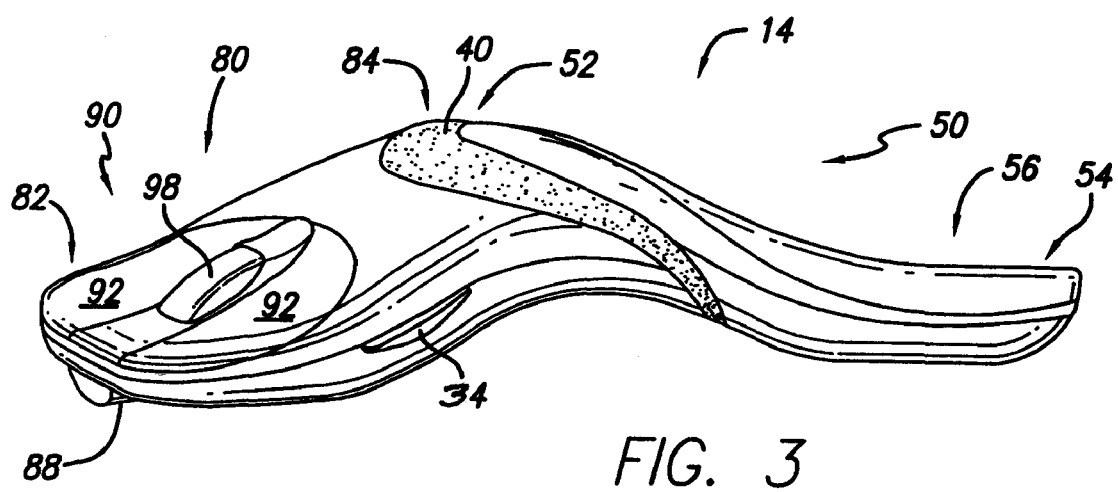
FIG. 3 is a perspective view of an input system according to an exemplary embodiment.

FIG. 3 shows another exemplary embodiment of an input system, generally at 14. System 14 may include a front portion 80 and a rear portion 50 coupled by a flexible middle portion 40. In this figure, front portion 80 is shown coupled to middle portion 40, which is flexed, such that front portion 80 has moved horizontally and vertically with respect to rear portion 50, without rear portion 50 being moved. Front portion 80 may include an input device portion 90, which may include buttons 92 and wheel 98. In this embodiment, front portion 80 may include a keel 88 to allow micro movements and/or vertical and/or horizontal movements of front portion 80 to control a cursor or other pointing device.

Front portion 80 may include a front end 82 and a rear end 84. Rear end 84 may be configured to couple to flexible middle portion 40, and to somewhat correspond front end 52 of rear portion 50. Rear portion 50 may include a rear end 54 as well as rest 56, which may be configured to support the wrist of a user in a comfortable and ergonomic position. With this configuration of system 14 this again may allow a user to move front portion 80 with respect to rear portion 50 without rear portion 50 moving. Again the arch-like configuration as well as the flexible and micro movement-capable configuration of the system may reduce the likelihood of repetitive stress injuries occurring.

Figure 4:
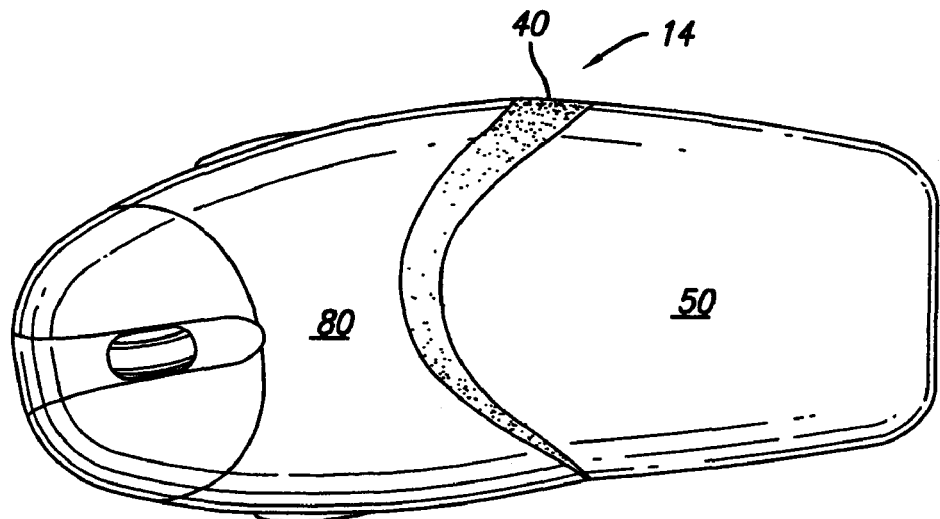
FIG. 4 is a top view of the exemplary embodiment of FIG. 3.

FIG. 4 shows a top view of the embodiment shown in FIG. 3, generally at 14. Again system 14 may include a front portion 80 and a rear portion 50 with a flexible middle portion 40. In this embodiment, front portion has been moved generally horizontally with respect to rear portion 50, without rear portion 50 being moved. This figure shows the ability of front portion 80 to move horizontally with respect to rear portion 50.

Figure 5:
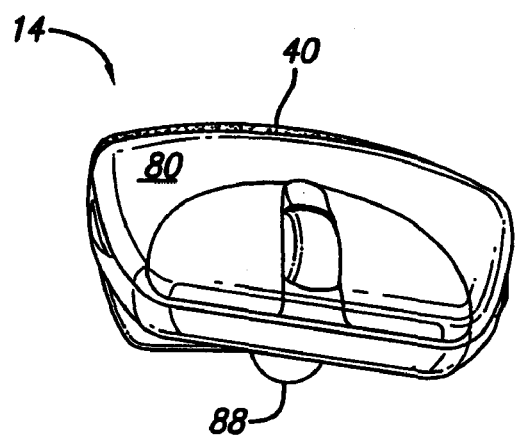
FIG. 5 is a front elevation view of the exemplary embodiment of FIG. 3.

FIG. 5 shows a front view of the embodiment of FIGS. 3 and 4, generally at 14. In this figure, front portion 80 is shown moved generally vertically, as well as slightly horizontally with respect to rear portion 50 (not shown in this figure). Again, system 14 may include a keel 88 which may facilitate and enhance the vertical and horizontal movements of front portion 80 with respect to rear portion 50, not shown. System 14 may again include a middle portion 40 which made be made of a flexible material such as foam, rubber, plastics, springs, and/or combination thereof, as desired.

It will be appreciated that although this system is shown generally as a computer mouse, other input systems are contemplated and encompassed by this disclosure. Furthermore, although a wireless mouse is shown, a wired mouse may be utilized without straying from the concepts disclosed herein.

Figure 6:
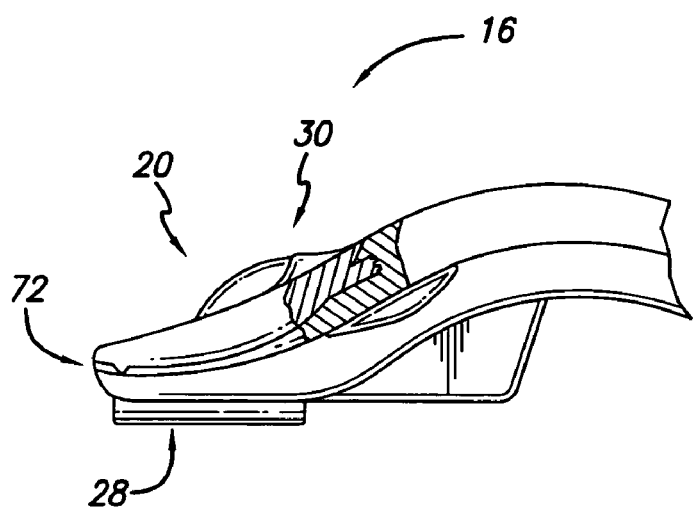
FIG. 6 is a side elevation view of an exemplary embodiment of an input system.

FIG. 6 shows a side elevational view of a front portion 20 of an input system 16. Front portion 20 may include an input device portion 30, which may be selectively couplable and selectively removable from the system, such that many different input device portions 30 may be utilized, according to a user's preference, among other considerations. System 16 again may include a keel 28 which may allow vertical and horizontal micro movements of front portion 20 with respect to the rest of the system. Input device portion 30 may include a lip 72 which may be configured to couple to front portion 20 such that input device portion 30 may couple to front portion 20 of system 16. It will be appreciated that other coupling configurations and methods may be utilized, as desired. With this configuration a user may be more likely to purchase the system as the input device portions 30 may be interchangeable, such that a user may use different input devices 30, as desired.

Figure 7:
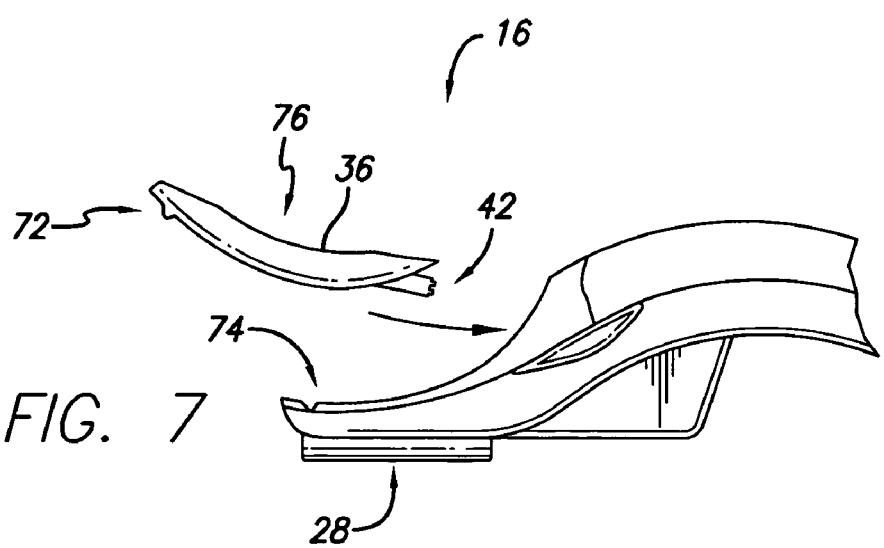
FIG. 7 is a side elevation view of an exemplary embodiment of an input system.

FIG. 7 shows another side elevational view of a system 16, according to another exemplary embodiment. System 16 may include an input device portion 76 which may include a touch pad 36 that may be utilized by a user along with keel portion 28 to control the movements of the pointing device and/or cursor, as desired. System 16 may include a groove 74 which may correspond to lip 72 to allow input device portion 76 to couple to the rest of the system. It will be appreciated that other coupling configurations and methods may be utilized, as desired. Furthermore, input device portion 76 may include connector 42 which may be electrical-type to allow signals to pass to and from input device portion 76 to the rest of the system. Furthermore, connector 42 may also be mechanical in nature to allow for more secure coupling of input device portion 76 to the system. Input device portion 76 may also include a track pad, track ball, stick, and the like, or other device used for inputting information into a computer, such as a device to move a pointer, as desired.

With this highly configurable, modular configuration, different types of pointing input device portions may be utilized with one system such that a user may be more likely to purchase the system. Furthermore with the overall ergonomic features of the various embodiments, repetitive stress injuries may be reduced. Furthermore, the various embodiments may allow for micro movements of the front portion with respect to the rest of the system. Furthermore, these vertical and horizontal micro movements may be similar to that of a stylus or writing pen, as desired.

Current devices may require that the user's wrist change in flexure in varying degrees to operate the device. This new configuration may allow a user to not flex their wrist when using this device. This anti-flexure configuration may further reduce RSIs and other injuries without impeding the productivity of the user. It may increase the productivity and comfort of the user when using this device.

Furthermore, the various embodiments may be more stylish than other mouse configurations such that a user will be more likely to purchase it. Furthermore, the interchangeability of input device portions may make it attractive to a user, such that a user who may not have bought the item because of the type of pointing device controller, may be more likely to buy this device as it may have interchangeable pointing device portions. This design may enhance the user's enjoyment of the use of a computer and may be purchased because of its design alone.

The embodiments disclosed herein may be 1-10 inches long by 0.5-4.0 inches tall by 1.0-6.0 inches wide. It will be appreciated, however, that other dimensions and configurations may be utilized, as desired. The embodiments disclosed herein may be a mouse for a computer, but other types of hand furniture may be created with this same or similar design to reduce repetitive and/or cumulative stress injuries, among others, and be made to be attractive to consumers.

The rear portion 50 may be designed with materials having characteristics including the ability to displace proportionally to the user's hand or wrist given the weight of the user's hand or wrist thereby providing for a custom user fit every time the device is used. It is also contemplated that the rear portion 50 may be designed with materials that will provide displacement memory during each use of the device for a period of 1-10 seconds, for example, after the user's hand and wrist are removed from the device. The rear portion may be designed with materials that are body heat responsive to an individual user's body temperature. The device may also include a set of user-definable macros that may permit the user to perform repetitive tasks, such as pointing the device and depressing the buttons or similar action, with ease and minimal effort.

While the embodiments disclosed herein may be presented for a right-handed person, it will be appreciated that a similar device may be configured for a left-handed person. In addition, the size of the device may be adjusted to accommodate a range of sizes in the human hand. It will be appreciated that the device may be made in a range of sizes that may vary from a generally smaller device for small children through a larger device for adults with exceptionally large hands, as desired.

In closing, it is to be understood that the exemplary embodiments described herein are illustrative of the principles of the present disclosure. Other modifications that may be employed are within the scope of the disclosure. Thus, by way of example, but not of limitation, alternative configurations may be utilized in accordance with the teachings herein. Accordingly, the drawings and description are illustrative and not meant to be a limitation thereof.

What is claimed is:

1. A computer input system, comprising:
    a mouse having a first portion, a second portion, and a middle portion connected therebetween, said middle portion cooperating with said first and second portions to define an arched configuration with said middle portion disposed at a higher elevation than said first portion;
    said middle portion being sufficiently flexible to accommodate horizontal and vertical displacement of said first portion relative to said second portion to effect computer control;
    said first portion having a surface contacting portion for contacting an underlying support surface, said middle portion permitting displacement of said first portion for movement horizontally in a direction generally parallel to said underlying support surface and vertically in a direction generally normal to said underlying support surface and with respect to said second portion to effect computer control;
    said surface contacting portion of said first portion comprising a generally centered and downwardly protruding and narrow profile keel configured to contact said underlying support surface.

2. The computer input system of claim 1 wherein said mouse further defines a laterally open recess underlying said middle portion and disposed between said first portion and said second portion.

3. The computer input system of claim 1 further including a selectively interchangeable input device configured to be selectively mounted onto said first portion.

4. A computer input system, comprising:
    a mouse having a first portion, a second portion, and a middle portion connected therebetween, said middle portion cooperating with said first and second portions to define an arched configuration with said middle portion disposed at a higher elevation than said first portion;
    said middle portion being formed from a flexible material to accommodate horizontal and vertical movement of said first portion relative to said second portion to effect computer control;
    said first portion having a surface contacting portion for contacting an underlying support surface and for movement horizontally in a direction generally parallel to said underlying support surface and vertically in a direction generally normal to said underlying support surface to effect computer control.

5. The computer input system of claim 4 wherein said mouse further defines a laterally open recess underlying said middle portion and disposed between said first portion and said second portion.

6. The computer input system of claim 4 wherein said surface contacting portion comprises a narrow profile keel configured to contact said support surface while allowing horizontal and vertical movement of said first portion relative to said support surface.

7. The computer input system of claim 4 further including a selectively interchangeable input device configured to be selectively mounted onto said first portion.

8. The computer input system of claim 1 wherein said narrow profile keel defines said surface contacting portion having a downwardly presented rounded contour for contacting said underlying support surface to permit tilting movement of said first portion relative to said underlying support surface.

9. The computer input system of claim 8 wherein said narrow profile keel cooperates with said middle portion to permit tilting movement of said first portion relative to said second portion.

* * * * *